United States Patent [19]

Given, Jr.

[11] Patent Number: 5,023,102

[45] Date of Patent: Jun. 11, 1991

[54] METHOD AND COMPOSITION FOR INHIBITING FAT BLOOM IN FAT BASED COMPOSITIONS AND HARD BUTTER

[75] Inventor: Peter S. Given, Jr., Glenco, Ill.

[73] Assignee: Nabisco Brands, Inc., East Hanover, N.J.

[21] Appl. No.: 497,685

[22] Filed: Mar. 23, 1990

Related U.S. Application Data

[63] Continuation-in-part of Ser. No. 292,532, Dec. 30, 1988, Pat. No. 4,923,708.

[51] Int. Cl.$^5$ .............................................. A23G 1/00
[52] U.S. Cl. .................................. 426/610; 426/631; 426/660; 426/306
[58] Field of Search ............... 426/610, 607, 631, 660, 426/601, 306

[56] References Cited

U.S. PATENT DOCUMENTS

| | | |
|---|---|---|
| 1,004,891 | 10/1911 | Moller . |
| 2,024,356 | 12/1935 | Harris . |
| 2,626,216 | 1/1953 | Cross . |
| 2,979,407 | 4/1961 | Duck . |
| 2,999,023 | 9/1961 | Babayan . |
| 3,491,677 | 1/1970 | Bracco . |
| 3,667,965 | 6/1972 | Frankenfeld et al. . |
| 4,237,146 | 12/1980 | Kahn et al. . |
| 4,461,777 | 7/1984 | Maurase et al. . |
| 4,664,927 | 5/1987 | Finkel . |
| 4,726,959 | 2/1988 | Momura et al. . |
| 4,812,318 | 3/1989 | Finkel . |
| 4,923,708 | 5/1990 | Given .............................. 426/631 |

FOREIGN PATENT DOCUMENTS

| | | |
|---|---|---|
| 635331 | 1/1962 | Canada . |
| 635336 | 1/1962 | Canada . |
| 823141 | 9/1969 | Canada . |
| 0020123 | 6/1990 | European Pat. Off. . |
| 48-04543 | 2/1973 | Japan . |
| 48-04544 | 2/1973 | Japan . |
| 2058974 | 3/1987 | Japan . |
| 2168071 | 6/1986 | United Kingdom . |

OTHER PUBLICATIONS

Minifie 1980 Chocolate, Cocoa and Confectionery, AVI Publishing Company, Inc., Westport, Conn., pp. 494–507.
Cerbulus, "The Effects of Various Substances on Blooming of Chocolate", Journal of Food Technology, 4, 133–140 (1969).
"Metabolic Studies of Glyceride Esters of Adipic Acid", The American Oil Chemists' Society, vol. 38, No. 2, pp. 84–86 (1961).
Rev. Intern. Chocolate 16, 345–368 (1961).
"Fat Bloom II, Study of the Liquid Fraction", Cholateric Confiseri de France, No. 322, 18–22 (1976).
"Fat Bloom III, Migration of Fat Materials in Composite Products", Chcolatic Confiseric de France No. 328, 3–11 (1976) (FSTA vol. 9, 1977), No. 2, 2K10, No. 12, K63.
Journal of Japan Oil Chemists Society 20(6), 322–355 (1971) (cited in FSTA, vol. 5, 1973), 12 N653.
1st Internation Congress on Cocoa and Chocolate Research, pp. 257–264 (1974) (cited in FSTA, vol. 8, 1976) 2K32.
Journal of Japan Oil Chemists Society 20(11) 807–810 (1971) cited in FSTA, vol. 5, (1973) No. 12, 12N654.

Primary Examiner—Carolyn Paden

[57] ABSTRACT

A fat bloom inhibitor from an aromatic, alkyl or alkenyl dialcohol and having a chain length of 4 to 22 carbon atoms substantially reduces the tendency of white or grey deposits on the surface of chocolate, hard butters, compound coatings and fat based compositions for extended periods of time. The products containing the fat bloom inhibitors further exhibit a prolonged gloss appearance which would otherwise become dull and hazy. The fat bloom inhibitors are intimately mixed throughout the fat composition and are selected from aliphatic and aromatic dialcohol. The preferred diols are the lower alkyl or alkenyl diols such as 1,6-hexanediol. Further, suitable dialcohols may include a hydroxyl or amino group or an ether, ester or amine linkage.

39 Claims, 8 Drawing Sheets

METHOD AND COMPOSITION FOR INHIBITING FAT BLOOM IN FAT BASED COMPOSITIONS AND HARD BUTTER

CROSS-REFERENCE TO RELATED APPLICATION

This application is a continuation-in-part application of Ser. No. 292,532 filed on Dec. 30, 1988, now U.S. Pat. 4,923,708.

BACKGROUND OF THE INVENTION

1. Field of the Invention

The present invention is directed to fat compositions, hard butters, hard butter confectioner's compositions, and highly flavored fat containing compound coatings having an improved gloss retention and an increased resistance to fat migration and fat bloom. More particularly, the invention relates to a fat bloom inhibitor for edible fat compositions such as chocolate and flavored hard butter compound coatings which can be added directly to the composition during processing.

2. Background of the Invention

The food and chocolate industry has consistently been contending with the phenomena known as fat bloom or chocolate bloom. Fat bloom is generally associated with the migration of fats toward the surface and the appearance of a white or light grey colored deposit on the surface of chocolate. Prior to the time the white deposit is visible, the product usually becomes dull and hazy having lost the high gloss surface. Although taste and texture of the overall product may not be seriously altered by the early stages of fat bloom the dull appearance and white deposit make it look old, stale and unappetizing to the consumer. Fat bloom, as a consequence, results in a loss of sales and increased handling and production costs to the manufacturer.

The problem of fat bloom of hard butter compound coatings and chocolate is extremely complex and believed to be caused by a number of independent factors often times with no correlation between them. The actual cause of fat bloom is not fully understood although several theories have been proposed. The principal of fat bloom is generally understood to be the migration of fats to the surface where they recrystallize. The fat crystals grow in size over time to produce a dull appearance on the surface. As the crystals grow still larger, the light colored deposit appears. It is this light colored deposit which is commonly referred to as fat bloom. Factors which are known to promote the occurrence of fat bloom include prolonged storage at high temperatures followed by cool temperatures, and cyclic temperature changes over a period of time such as may occur during shipping and handling.

Chocolate, chocolate coatings and chocolate flavored hard butter coatings are particularly prone to fat bloom. Chocolate is an intimate mixture of cocoa butter, sugar, cocoa particles and lecithin. Optional ingredients such as milk solids, vanilla flavoring and nuts may be added. The cocoa butter in chocolate is known to be present in at least three polymorphic forms. The polymorphic behavior of cocoa butter is believed to be a contributing cause of fat bloom in chocolates. The presence and ratio of the different polymorphic forms is, at least in part, dependent on the processing conditions and tempering of the chocolate. The different crystal forms of the cocoa butter are most readily identifiable by their melting points and x-ray diffraction pattern corresponding to the different molecular orientations.

Solid fats as a class tend to exhibit polymorphism. Polymorphism is generally described as the ability of the solid to exist in several different crystalline forms. The different crystal forms have a marked effect on the melting point of the fat.

The crystalline forms of cocoa butter have different energy potentials such that those with the higher energy potential (free energy) are less stable and tend to transform to the configuration of the low energy form. The stability is generally attributed to the chair configuration about the triglyceride linkage and the ability of the molecules to stack on each other in a lattice-like fashion resulting in tighter packing. The stable form has the highest melting point of the different crystal forms and is the preferred form in manufacturing most products.

When the comparatively unstable crystalline forms transform to the stable form, considerable amounts of energy are released as heat causing a temporary increase in the amount of liquid phase in the chocolate. It is believed the liquid phase tends to dissolve the higher melting crystal fractions, which then migrate to the surface where they recrystallize to form fat bloom. It is therefore desirable to have the fat present in the stable crystal form or at least increase the ratio of the stable form in the fat mixture. The desirability of the more stable form is also due to its resistance to migrate compared to the other crystal forms. One proposed theory for the resistance to migration is the tighter packing of the lattice structure formed by the chair configuration of the crystals. The lattice is formed by adjacent crystals stacking on each other in an inverted position. The lattice has been proposed to form a network of crystal lamella functioning as a barrier to inhibit the migration and recrystallization of the fat.

The presence of the crystalline forms and their instability ar evident by a comparison of the Differential Scanning Calorimetry (DSC) melt profiles over a period of time. DSC essentially records and charts the melting points or melting range of the various components of a composition. The height of individual peaks are generally in proportion to the approximate ratios of the amount of components present. The cocoa butter in chocolate, for example, can reveal three or more peaks corresponding to the different crystal structures. A series of DSC profiles carried out over a period of weeks and months show a gradual merging of the peaks toward a single peak corresponding to the most stable form. This reduction in the height of some of the peaks demonstrates the conversion of the relatively unstable crystal form into the more stable form.

A cocoa butter composition, such as chocolate, having a substantial portion of the fat in the stable form has shown a lesser tendency to fat bloom and a longer gloss retention of the surface over an extended period of time compared to some confectioner's compositions or hard butters. The industry has sought to increase the concentration of the stable forms and to stabilize the fats in the composition by the use of various chemical additives and chemical modifications to immobilize the fat crystals.

In the manufacture of chocolate and confectioner's compositions, careful control of the processing steps are known to effect the loss of gloss and the rat and extent of fat bloom. This is particularly true in the chocolate enrobing of fat based centers. For example, as described in "Studies On The Formation Of Fat Bloom And Methods Of Delaying It" *Rev. Intern. Choc.* 16, pg 345–68 (1961) controlling the temperature of a fat based center is essential to achieve a stable chocolate coating having a high gloss retention and good texture. The fat from the center may tend to migrate into the coating thereby changing the composition of the coating. The coating of cold centers with the melted chocolate tend to develop a multitude of fine hairline cracks and prevent proper crystal growth. These cracks are generally due to the sudden setting of the coating over the cold center but have also been attributed to a rapid external cooling followed by syneresis. These hairline cracks are believed to promote fat bloom in the coating and in particular those with a high fat center. The general practice is to pre-warm the centers thoroughly before coating and to gently cool the coated product over a period of time to reduce the formation of the cracks.

In addition to proper cooling of the chocolate, fat bloom is dependent on the proper tempering of the chocolate. Tempering is generally the controlled heating to melt fat crystals and cooling under controlled conditions to a predetermined temperature to obtain small fat crystals in as stable form as possible. Chocolate should have a high gloss and a hard clean break. The high gloss and texture is achieved only by the presence of minute stable fat crystals evenly dispersed throughout the fat system. Fat bloom can be appreciably retarded when there is a complete dispersion of the non-fat components in the fat to form a continuous uninterrupted layer of fat.

Hard butter and confectioner's coatings containing hard butter differ from the relatively predictable nature of cocoa butter since hard butters are usually made up of a very large number of different triglycerides and fatty acids. Hard butters may be made from several vegetable fats and contain as many as 10–80 different components. These different components tend to behave as if made up of a single component. When solidified and crystallized, the compound exhibits a single, although sometimes broad, melting point range. Some of these compositions, on the other hand, tend to exhibit self-fractionation. Self-fractionation occurs when some of the components form distinct crystals separate from the composition and act as different components which have a different melting point range from the rest of the composition. This complex nature of the fractionation of hard butter compositions is more likely the cause of the fat bloom, rather than polymorphism as is speculated for cocoa butter. In direct contrast, the characteristics of hard butter and confectioner's compositions, chocolate and cocoa butter are almost entirely due to the polymorphic behavior of the triglycerides. In view of these differences between hard butter and cocoa butter, a component which has been effective in retarding fat bloom in cocoa butter may not necessarily be effective in controlling bloom in hard butter compositions.

Compound coatings which are unfractionated are generally prone to self-fractionation and fat bloom. The compositions which have been fractionated may demonstrate a decreased tendency to self-fractionate and produce fat bloom, although fractionation is not cost effective in commercial operations.

Numerous attempts have been made in the past to inhibit fat bloom by chemical modification of the cocoa butter glycerides by selective hardening and transesterification or by the inclusion of various chemical additives. These efforts have demonstrated only limited success in inhibiting fat bloom while exhibiting a number of adverse side effects and increased production costs.

Some of the chemical additives which have been somewhat effective in inhibiting fat bloom in chocolate are not commercially feasible due to the alteration of the flavor and texture. A satisfactory bloom inhibitor must prolong the shelf life of the product by retaining the gloss without changing the taste, sweetness or texture. Similarly, the inhibitor should have no aftertaste and should not alter the melting point of the chocolate.

One such effort is disclosed in U.S. Pat. No. 4,664,927 relating to the immobilizing of the normally flowable fats at temperatures above their normal melting point. The procedure provides for the addition of a liquid polyol, such as glycerine, to increase the viscosity of the system by reacting with the fat in the liquid phase. The increase in viscosity is intended to prevent the chocolate product from melting at low temperatures and from adhering to the wrapper. The process does not address the problem of fat bloom. In addition, the gloss retention is not enhanced by the addition of the liquid polyols containing at least one pair of vicinal hydroxyl groups.

One type of fat bloom inhibitor is described in U.K. Patent Application 2,108,071A which employs a triglyceride composition having a 30–100% by weight $C_{50}$–$C_{52}$ fatty acid content and an iodine value of 0.5. The preferred glycerides include the fully hydrogenated oils of palm, cottonseed, rice, corn, illipe butter, cocoa butter, phulwara butter and fractionated milk fat. These compounds are stated to be effective in inhibiting fat bloom without resulting in a waxy or firm texture that has been characteristic in the use of highly saturated fats.

Japanese Patent Nos. 7304543-R and 7304544-R describe a similar type of additive to enhance anti-blooming properties of chocolate. The described inhibitor comprises a hardened butter from hydrogenated castor oil and a hardened lard fraction. The resulting hardened butter is then added to a prepared chocolate and processed under conventional procedures.

Still another use of triglycerides to attempt to inhibit fat bloom is described in Momura U.S. Pat. No. 4,726,959. In this composition the bloom inhibitor comprises a mixture of triglycerides of both saturated and unsaturated fatty acids. Canadian Patent No. 823,141 discloses a method of controlling fat bloom by the addition of interesterified triglycerides.

As reported in Kleinert, "Formation Of Fat Bloom and Methods Of Delaying It" *Rev. Intern. Chocolate.* Vol. 16, 345–68 (1961) a few of the glycerides which have shown some fat bloom inhibiting effects include Biscuitine fat, hardened arachis fat and butter fat. The results from this study report that to achieve the fat bloom inhibiting effects, the processing conditions, such as cooling and tempering, must be carefully controlled.

The previously employed methods of inhibiting fat bloom in chocolate have experienced only limited success due to the undesirable changes in the texture, mouth feel, melting point and taste of the final product.

Extensive research has been conducted to develop effective bloom inhibiting additives which can be combined directly with the triglyceride composition. A few of these additives which have shown some bloom inhibiting characteristics have been reported in Cerbulus, "The Effects of Various Substances On The Blooming Of Chocolate", *Journal of Food Technology* Vol. 4, 133-140 (1969). For example, chocolate containing additional quantities of the triglyceride tripalmitin is reported to have no tendency to bloom and no adverse flavor changes. On the other hand, the additives Deft 37 (trademark) and Edelfette (TDM) (trademark) improved the bloom resistance of samples tested, but were unacceptable due to the waxy taste.

Examples of other additives which have been ineffective in controlling or retarding bloom in cocoa butter include hydrogenated butter fat, butylated hydroxy anisole (BHA), glycerol and various amino acids. Moreover, the hydrogenated butter fat produced an unpleasant taste while BHA resulted in an unsightly white appearance with a granular texture.

Anhydrous glucose has been shown to produce a high resistance against fat bloom in proportions amounting to 15%-20% by weight of the chocolate. Glucose, however, resulted in a distinct aftertaste in the throat after eating.

Other compounds that have been suggested for possible fat bloom prevention with only limited success include amino acids such as alpha amino N-butyric acid, glycine, cysteine and glutamic acids, bile acids, cetyl alcohol, cholesterol, choline-HCL, citric acid monoglyceride, lactose, low HLB sucrose polyesters, maltrins, methionine, polymerized cocoa butter, phytic acid, polyglycerol fatty esters, polyoxyethylene sorbitan monostearate, propylene glycol fatty acid esters, sorbitan monolaurate and monostearate, and taurine. Although many different types of compounds have been suggested for use as fat bloom inhibitors, they have generally proved to be unacceptable in commercial practices.

There is accordingly a need for an effective additive which will enable a hard butter, confectioner's composition and chocolate to retain its gloss, prolong shelf life and inhibit the formation of the white crystalline fat deposits on the surface without having an adverse impact on the flavor of the finished food product.

The present invention is therefore directed to an effective bloom inhibiting additive which prolongs the gloss of hard butter, chocolate, and other hard butter based systems such as confectioner's coatings and prevents the formation of fat bloom on the surface of the product. The additives according to the invention do not adversely affect the sweetness, taste or texture of the finished product.

SUMMARY OF THE INVENTION

The disadvantages and limitations of the previously employed fat bloom inhibitors and methods of processing to control fat bloom are obviated while providing an effective additive for prolonging gloss and inhibiting fat bloom in edible triglyceride-containing compositions. The additives according to the invention do not alter the taste, melting point or viscosity of fat based products such as chocolate, hard butters and confectioner's composition. More particularly, the invention relates to chocolate and chocolate flavored fat-containing compositions suitable for use in coating over cookies and other edible centers without incidence of fat bloom or a loss of the glossy surface.

The novel fat bloom inhibiting additives are preferably solid, linear omega-diols having 6 to 24 carbon atoms in the chain and terminal hydroxyl groups. The backbone of the diol is preferably a straight alkyl chain having 6 to 24 carbon atoms and are solid at room temperature. The alkyl chain may alternatively be branched and contain one or more points of unsaturation, an amine, aromatic moiety, carboxyl or ether linkage. One or more of the carbons in the chain may have an amino, hydroxyl or lower alkyl ester substituent.

The preferred dialcohols are the poly (methylene) glycols from 6 to 24 methylene groups in solid form. The dialcohols which are solid at room temperature are generally reduced to a fine granular form and added directly to the fat-containing composition during the melting and mixing step in the preparation of the composition. The particle size of the diol may be, for example, between 5 to 200 microns and may be a mixture of different size particles. Particles ranging in size of 10 to 30 microns are preferred in prolonging the gloss and retarding the formation of fat bloom without adversely affecting the taste or texture of the product.

The amount of the diol added to the fat containing composition will vary depending on the diol utilized, the fat system and its tendency to fat bloom and the target shelf life. The amounts of diol found effective in inhibiting bloom formation without altering the other characteristics of the fat composition are from about 0.1 to about 5.0 percent by weight of fat present. The preferred range is between about 0.1 and about 2.0 percent by weight of fat at about 20 micron particle size for solid diols.

The novel bloom inhibitors have been found useful in prolonging the gloss of chocolate coated centers, and chocolate flavored confectioner's and compound coatings generally employed to coat candy, cookies, baked or fried breads, rolls, pastries, snack foods, breakfast cereals and other edible products such as dried fruits or a fruit paste. By incorporating the diols according to the invention in the fat compositions the incidence of bloom is reduced and the products display a longer shelf life without losing the initial gloss.

BRIEF DESCRIPTION OF THE DRAWINGS

The invention is to be understood in conjunction with the figures of which the following is a brief description.

DETAILED DESCRIPTION OF THE INVENTION

Figure 1:
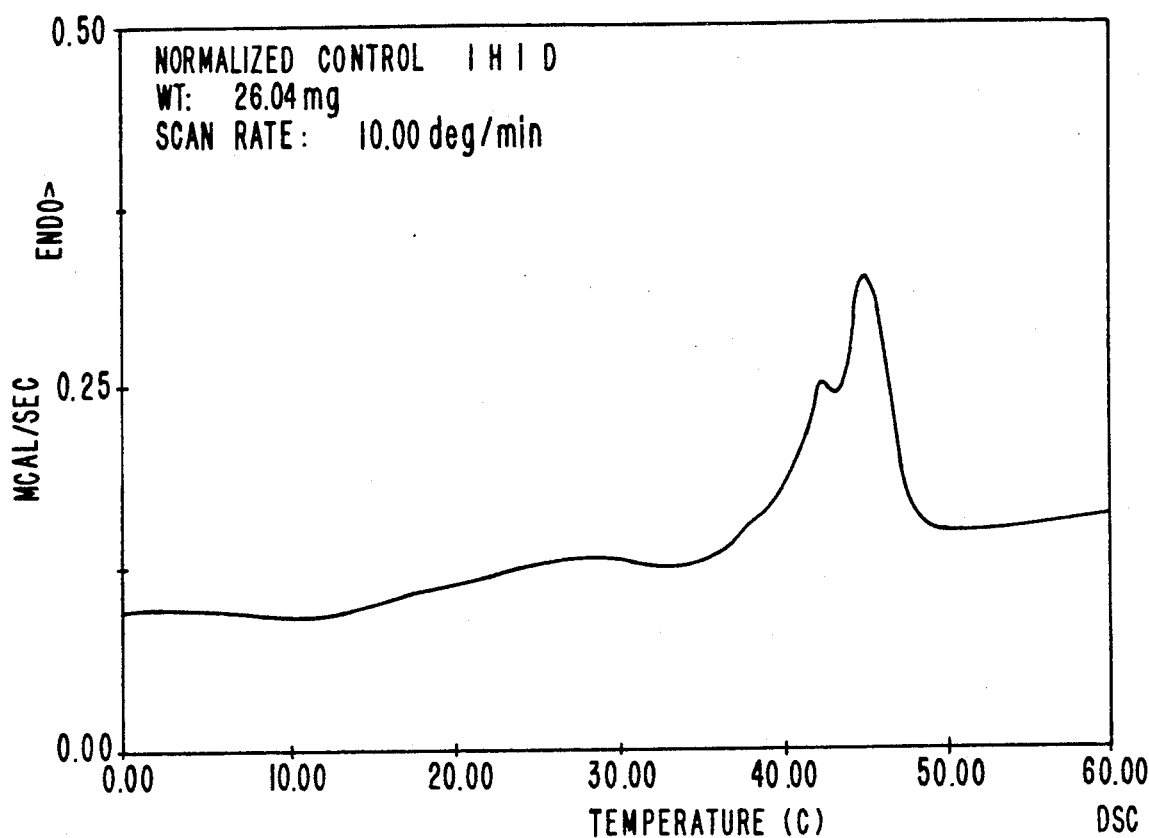
FIG. 1 is a DSC melt profile of an unfractionated hard butter confectioner's composition day after cooling from a melt.

The present invention is directed to a novel fat bloom inhibitor particularly useful in controlling and retarding the migration of fats and the formation of fat bloom on the surface of a fat-based composition. The novel fat bloom inhibitors are particularly useful in controlling bloom in edible compositions such as chocolate, compound coatings and confectioner's compositions.

In the present invention fat bloom is intended to refer to the migration of the triglycerides to the surface of the product which is characterized by the loss of the glossy appearance and eventually the formation of the white haze. Although fat bloom is simply the formation of small fat crystals on the composition, its appearance is generally considered unpleasant to the consumer. The ability to prevent or retard fat bloom will provide an extended shelf life and a more pleasing appearance to the product thereby resulting in reduced losses to the manufacturer.

It is generally believed that in cocoa butter and some fat compositions, fat bloom is due in part to the polymorphic behavior of the fat crystals and the tendency of the unstable crystal forms to transform to the more stable form. During the transformation to the most stable form, the unstable fat crystals release energy as heat and tend to liquefy and dissolve the higher melting crystals. The melted fats then migrate and recrystallize on the surface to form fat bloom. As the crystals on the surface continue to grow and become larger, the surface gloss disappears and the white powder deposit builds up. During the production of tempered chocolates and tempered hard butter, it is desirable to have the fats present in the most stable form as this has been shown to reduce the tendency of fat bloom.

In the preferred embodiment of the invention, the fat composition is chocolate or confectioner's compositions as are well known in the art. Chocolate, as used herein, refers to a cocoa butter-based composition containing sugar, cocoa powder, chocolate liquor and lecithin. Confectioner's compositions of the invention are generally comprised of 20%–50% hydrogenated, fractionated or interesterified fats or shortening, and 50%–80% by weight suspended solids including, for example sugar and flavoring agents such as cocoa powder, lecithin, milk solids and vanilla. The chocolate and confectioner's compositions employed in the invention are particularly suitable for enrobing cookies, fruits and high fat compositions.

The fats, according to the preferred embodiment of the invention, are those generally employed in such confectioner's compositions, including for example the vegetable fats such as palm oil, cocoa butter, palm kernel oil, soybean oil, corn oil, illipe oil, phulwara oil, coconut oil, peanut oil, cottonseed oil, and rapeseed oil. The preferred fats are solid or semi-solid at room temperature and exhibit a tendency to flow at temperatures slightly above room temperature. A suitable fat used in the industry in a compound coating is derived from palm kernel oil. Palm kernel oil is primarily made up of triglycerides of lauric, palmitic, stearic, oleic, and myristic acids. The actual percentage of each triglyceride will vary depending on the source and industrial modification including refining, hydrogenation and interesterification. The examples discussed in detail below exemplify the primary use of such confectioner's composition as a fudge type coating composition used to enrobe cookies, breads, pastries, crackers, snack foods, cakes, candies, fruit pastes, dried fruits and the like.

Chocolate flavored compound coatings in the past have exhibited a tendency to bloom and a loss of gloss when used to enrobe confectioneries, fruits, nuts, cookies and cakes, due in part to the relatively high fat content of the base. By incorporating one or more of the novel bloom inhibitors, as discussed hereafter in greater detail, the coated confectionery products display improved resistance to bloom and a retention of the high gloss surface. Accordingly, the present invention is further directed to a cookie or cake coated with a confectioner's composition having an improved resistance to fat bloom. In particular, the invention is concerned with chocolate flavored or fudge coated cookies, since the fat bloom is more readily noticed on a dark fudge coating.

The fat bloom inhibitors in accordance with the invention include the aromatic and aliphatic di-alcohols. In the preferred form of the invention the diol is identified by the formula:

$HOCH_2$-R-$CH_2OH$ wherein R is a branched or straight chain alkyl or alkenyl having 4 to 22 carbon atoms or an aromatic moiety. The one embodiment R is a straight chain alkyl having 4 to 14 carbon atoms. The alkenyl group may have more than one point of unsaturation. R may further be $(CH_2)_x$-$R_1$-$(CH_2)_y$ wherein $R_1$ is an ether, aryl, amide, carbonyl, amine or carboxyl ester group and x and y are 0 or an integer from 1–22 provided that the sum (x+y) is an integer from 4 to 22. The alkyl diols which are particularly suited for the invention include, for example, 1,6-hexanediol, 1,7-heptanediol, 1,8-octanediol, 1,9-nonanediol, 1,10-decanediol, 1,12-dodecanediol and 1,16-hexadecanediol. Other examples of effective bloom inhibitors include 4-aza-5-keto 10-decanediol, 5-oxo-1,9-nonanediol and p-pentanol-α-hydroxytoluene.

The amount of the novel fat bloom inhibitor utilized in the fat system will vary depending on the types of fat contained in the composition and the particular diol employed. Other factors which will affect the amount of diol used include the particle size of the diol, the expected shelf life and the inherent tendency of the particular composition to bloom. The amount of the diol considered effective in preventing bloom in confectioner's compositions is, for example, in the range of about 0.1 to about 5.0 percent by weight of fat. A confectioner's compound coating will typically have about 31% to 33% fat. This translates to about 1.6% to about 1.7% by weight of the bloom inhibitor based on the total weight of the composition including sugar, milk solids and the like. The preferred range is generally between 0.1 percent and 2.0 percent by weight of the fat.

The optimum amount of the diol which can be added to edible fat systems is further limited by the effects of taste and texture of the additive. The diols are generally insoluble in a fat system and thus remain in their crystalline form. Excessive amounts of the diol may result in a grainy texture to the product and taste carrying through.

In one embodiment of the invention, 1,16-hexadecanediol is used having an average particle size of about 150 microns and added to a hard butter composition in the amount of 5.0 percent by weight of fat. At this concentration, however, the taste of 1,16-hexadecanediol may carry through to the final product to impart an undesirable flavor. In addition, particle sizes in the range of 150 microns tend to adversely effect the texture and mouth feel of the confectioner's composition.

The ability of the diol to prolong the gloss and prevent fat bloom is believed to be directly related to the particle size of the diol. As the particle size is reduced, the surface area is increased thereby increasing the active nuclei and increasing the fat bloom inhibiting effects. Since the surface area of the particles is also related to the tendency to influence the flavor of the product, a balance must be maintained between the bloom inhibiting effects and the adverse flavor characteristics. The particle size of the diol, according to the invention, may range, for example, between about 5 and 200$\mu$. The preferred particle size of the diol is in the range of 10 to 30$\mu$. Particle sizes in this range generally correspond to the particle size of the solids in the composition such as sugar and cocoa powder. Alternatively, the diol may be use as received from a supplier. The particle size of commercially available diols generally range between 50 and 150 microns.

In the invention the solid diol may be milled to a particle size of approximately 20 microns. This particle size corresponds essentially to the size of the solids in the confectioner's composition, such as sugar, cocoa powder and milk solids. The diol is then mixed with the hard butter composition in an amount of, for example, approximately 0.1 percent to 2.0 percent by weight based on the weight of the fat. This generally produces an edible composition which exhibits a prolonged gloss and a reduced tendency to fat bloom without adversely affecting the flavor and texture of the composition. The particle size of the diol should be as small as possible to achieve the maximum bloom inhibiting effects. The amount of bloom inhibitor used is generally limited only by the undesirable effects on the taste and texture of the product.

The hard butter and confectioner's composition may be obtained commercially or prepared according to standard procedures as are well known in the art. The confectioner's composition is initially heated to about 35° C. to 70° C. for a sufficient time to melt all of the fat crystals and to erase all crystal memory. The diol is slowly added to the composition while mixing for a period of time to uniformly disperse the diol, generally in the range of 1 to 120 minutes. The composition is tempered by cooling the melt to about 28°-32° C. until a thickened consistency is obtained. The composition is then carefully heated to about 34°-36° C. and transferred to a suitable mold or applied as a coating.

Since the actual mechanism and causes of fat migration and fat bloom are not fully understood, there is some uncertainty in the mechanism by which the diols inhibit fat bloom formation. Under normal circumstances a confectioner's composition or a compound coating may contain several crystal forms dispersed throughout the matrix. Over an extended period of time, the less stable crystal forms tend to undergo a monomorphic transformation to the more stable crystal form, which is usually accompanied b the formation of fat bloom. The absence of the less stable crystal forms has been shown to produce a composition which is less prone to fat bloom.

One proposed mechanism for the effectiveness of the diols is the interaction of the diols with the stable form of the fat crystals. The diols which have been shown to be particularly effective have a chain length similar to the chain length of the fatty acid of the triglycerides in the fat system. The diols having a chain length of less than six carbons have generally shown minimal bloom inhibiting effects in confectioner's compositions or cocoa butter, which contain large amounts of triglycerides of fatty acids having 16-18 carbons.

It is well documented the most stable form of the triglycerides in hard butter is the crystal structure which has a chair configuration formed about the triglyceride linkage. In the chair configuration the triglycerides tend to stack one upon another to form a lattice-type structure. One proposed theory for the effectiveness of the diol is that the polar hydroxyl groups tend to form a polar bond with the polar regions of the triglyceride and pull the molecules toward each other, thereby strengthening the lattice structure and the lamellar layers. This increase in strength of the lattice structure tends to favor the transformation of the triglycerides from the unstable crystalline forms to the more stable form. The strength of the lattice structure increases as the overall mobility of the lower melting crystal fractions decreases. This reduced mobility is believed to inhibit the migration of triglycerides and the formation of fat bloom. The shorter chain diols may not be able to span the distance between the polar regions of the triglyceride and thus not strengthen the lamellar layers as do the longer chain diols.

An alternative proposed mechanism for the fat bloom inhibiting effects of the diols is the ability of the diol groups to form hydrogen bonds between polar regions of the proteins present in the composition and the sugars. The hydrogen bonding between the proteins and the sugars are believed to form an additional lattice structure which is able to further immobilize the fat system and thus prevent fat recrystallization on the surface of the finished product.

The diols of the present invention do not react with the fats in the composition. The diols are solids at room temperature and therefore do not dissolve in the fat. The fat crystals are believed to interact with the triglyceride linkages only to the extent of promoting the stable crystal structure. The mixtures of the fat compositions and the diols according to the invention do not experience changes in viscosity or changes in melting point. For example, a compound coating composition which had an initial viscosity of 332 centipoise showed a viscosity of 325 centipoise after the addition of a diol. Stabilized chocolate and hard butter compositions can be prepared by forming an intimate mixture of the fat and the diols without interfering with the desirable characteristics of the composition including for example, melting point, viscosity, taste, color and texture.

In order to measure the occurrence of fat migration and fat crystal growth on the surface of the composition, a number of analytical methods have been employed for comparative purposes. It is known the gloss of the composition is directly related to the size of the particles on the surface. Once the crystals reach a critical size, the surface of the composition becomes dull and the amount of specular reflected light is decreased. One method that has been employed to measure the fat bloom therefore seeks to measure the amount of light that can be reflected from the surface of the composition over a period of time, thereby giving an indication of the change in fat migration and crystal growth. Suitable means to determine bloom may include visual inspection and comparison with a control sample and by the use of a reflectometer.

The preferred method of measuring fat bloom employs Differential Scanning Calorimetry (DSC). Unlike the other methods employed, DSC does not directly measure the visible changes in gloss on the surface but rather determines the ratio of crystalline components in the composition giving an indication of the likelihood of bloom occurring. Essentially, DSC measures and records the heat of fusion of the different crystal forms in the sample and provides a melting profile corresponding to the different crystal structures present. Since the presence of the more stable form of the fat crystals is known to decrease the probability of fat bloom the DSC melt profile gives an accurate indication of the probability of the sample developing fat bloom.

Differential Scanning Calorimetry measures the quantity of energy absorbed during melting of the composition which is then plotted against the temperature to give a thermogram. The thermogram appears as one or more peaks where each peak is indicative of the melting point of the various components in the composition. A thermogram of a standard tempered cocoa butter composition may typically show at least three distinct peaks representing the multiple crystal forms. The different crystal forms are generally distinguishable by their different melting points. As a general rule, the relative heights of the peaks correspond to the amount of each crystal form present.

A series of DSC thermograms when made from a standard cocoa butter composition over an extended period of time reveals a very slow change in compositions, as reflected in the small change in the thermogram. Some of the peaks will diminish in height while one peak will gradually increase in height. The change in the peaks are the result of the transformation of the unstable crystal forms into the more stable form. As the unstable crystal form is transformed, the peak corresponding to the unstable form diminishes in height while the peak corresponding to the stable form increases in height. As long as the unstable crystal forms are present in the composition, the inherent tendency of fat migration and fat bloom to occur is present.

The following examples demonstrate the above-noted characteristics of cocoa butter, hard butter and confectioner's compositions and the effects of the diols on the prevention of bloom and prolonging the gloss. Comparative graphs are presented to demonstrate the characteristics of hard butter and confectioner's coating compositions and the effects of the novel fat bloom inhibitors. When used herein the stabilizing effect of the inhibitor is intended to refer to the interaction of the diols with the triglycerides which reduce the tendency of the triglycerides to self-fractionate. As demonstrated below, the diols have the ability to interact with the triglycerides and stabilize them in a manner such that they behave and produce melt profiles as if they were made up of a single component, rather than the large number of triglycerides which usually make up a hard butter or compound coating. All of the examples were carried out using commercially available unfractionated, partially hydrogenated and interesterified compound coating compositions.

EXAMPLE 1

The characteristics of fat bloom in relation to the tendency of hard butters to self fractionate was examined using a commercially available confectioner's compound coating composition. The coating composition examined was an unfractionated and partially hydrogenated and interesterified composition sold under the trade name Ambrosia S-5252-K by Ambrosia Chocolate Company. The coating composition contain approximately 32% by weight fat and about 68% by weight solids such as sugar, cocoa powder and other flavorings. The fat component consisted of a mixture of several hydrogenated and/or interesterified triglycerides. The samples were heated to melting at about 60° C. to erase any crystal memory of fat crystals. The melt was then cooled at a rate of about 6° C. per minute to about 20° C. The coating composition was separated into 3 samples which were stored under controlled conditions. The first sample was held at about 20° C. for one day and stored in a stabilized condition by quickly freezing to −10° C. The second sample was held at 20° C. for four weeks and then stored by freezing to −10° C. The third sample was held at 20° C. for eight weeks and then frozen to −10° C. A DSC melt profile of each sample was then prepared to compare the changes in crystal structure of the composition.

The DSC melt profile of the first sample is illustrated in FIG. 1. The melt profile shows the tendency of hard butter compositions to self fractionate as indicated by the broad peak between about 38° and 48° C. The split peak and the broad hump extending from about 15 about 35° C. is indicative of the self fractionating characteristics of the composition.

Figure 2:
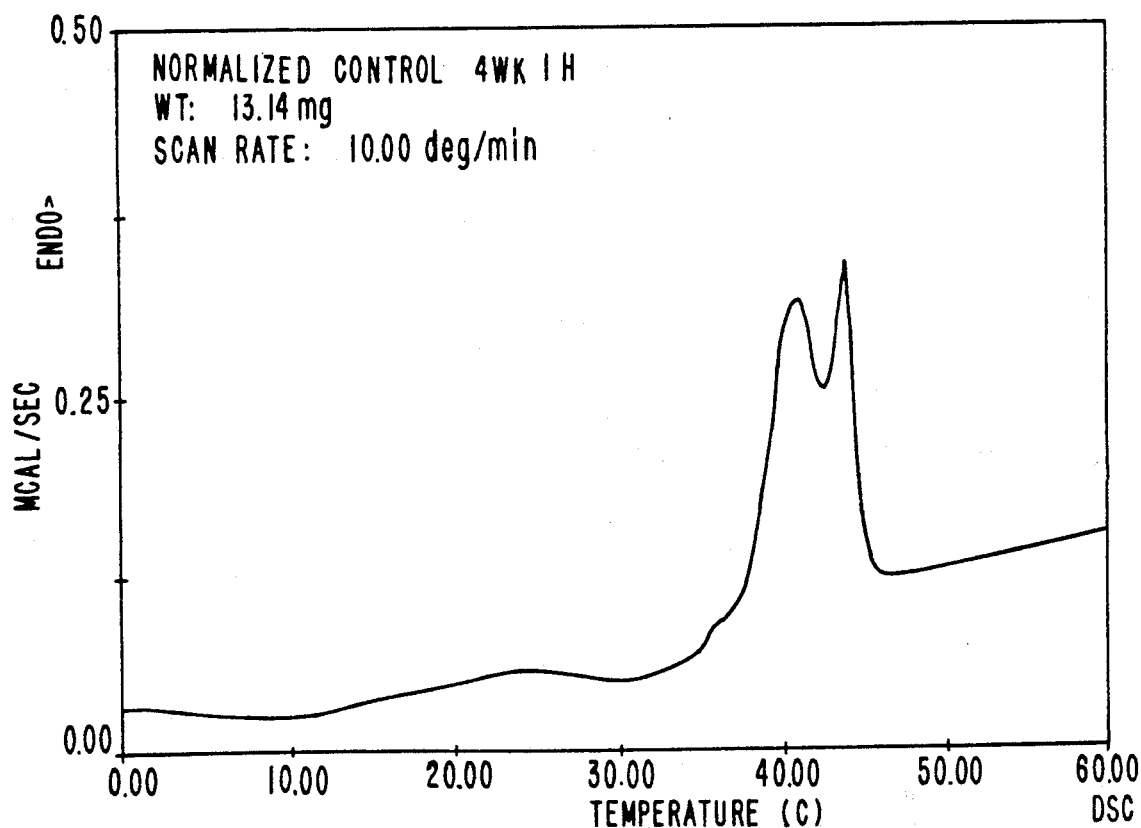
FIG. 2 is a melt profile of an unfractionated hard butter confectioner's composition after four weeks.

The DSC melt profile of the second sample after being held at 20° C. for four weeks is shown in FIG. 2. This melt profile shows a gradual stabilizing effect of the composition over time. The largest peak as shown in FIG. 2 is not as broad as the peak in FIG. 1 although a more pronounced double peak now appears. The double peak is believed to be due to the tendency of the composition to self fractionate. The broad peak between 15° and 35° C. of the composition is less pronounce after four weeks as shown in FIG. 2 compared to the peak as shown in FIG. 1.

Figure 3:
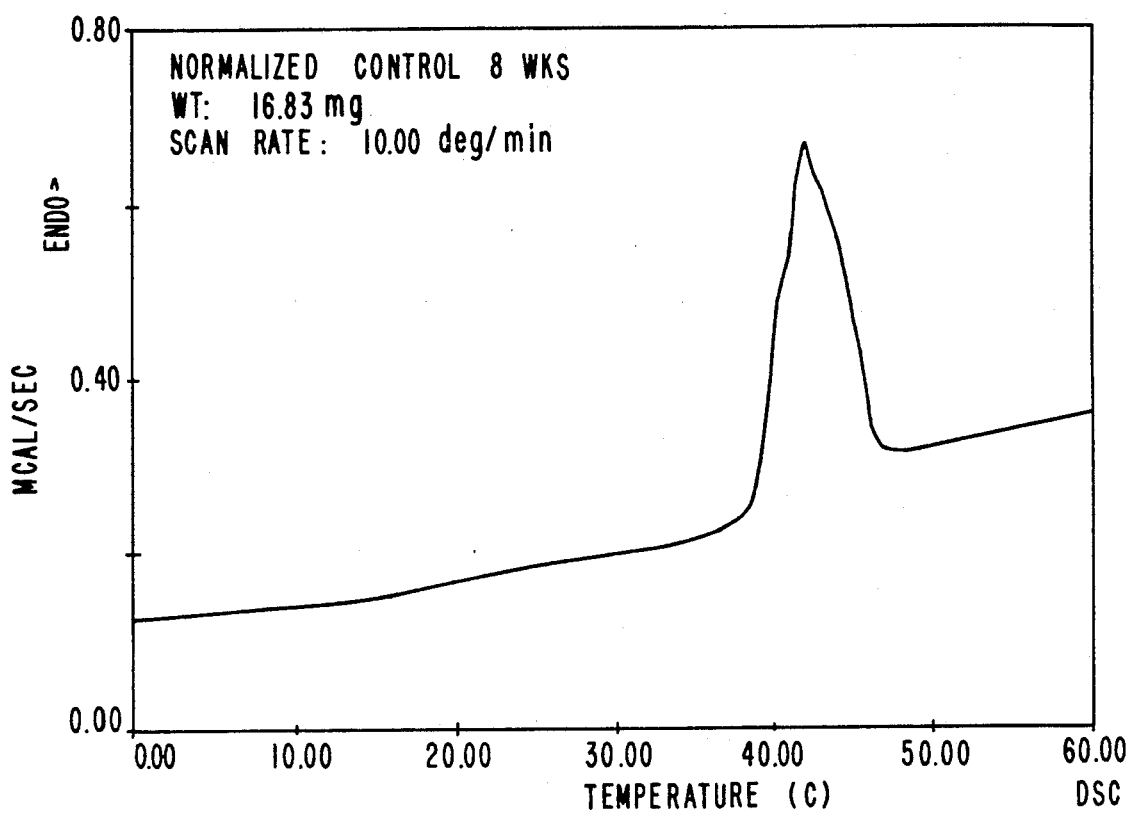
FIG. 3 is a melt profile of an unfractionated hard butter confectioner's coating composition after eight weeks.

A DSC melt profile was then prepared from the third sample as shown in FIG. 3. This melt profile shows a more pronounced and sharper peak at about 42° C. The broad hump previously between 15° C. and 35° C. is less pronounced. The broad peak at about 42° C. is about the same width as the peak of the DSC after about four weeks as shown in FIG. 2. The merging of the two peaks as shown in FIG. 2 demonstrates the unstable nature of the fats in the composition. The width of the peak experiencing little or no change from the melt profile of FIG. 2 demonstrates the crystal forms from fractionation and polymorphism are still present in significant amounts in the compositions. After eight weeks the composition will generally have a hazy appearance indicating the early stages of fat bloom.

EXAMPLE 2

Figure 4:
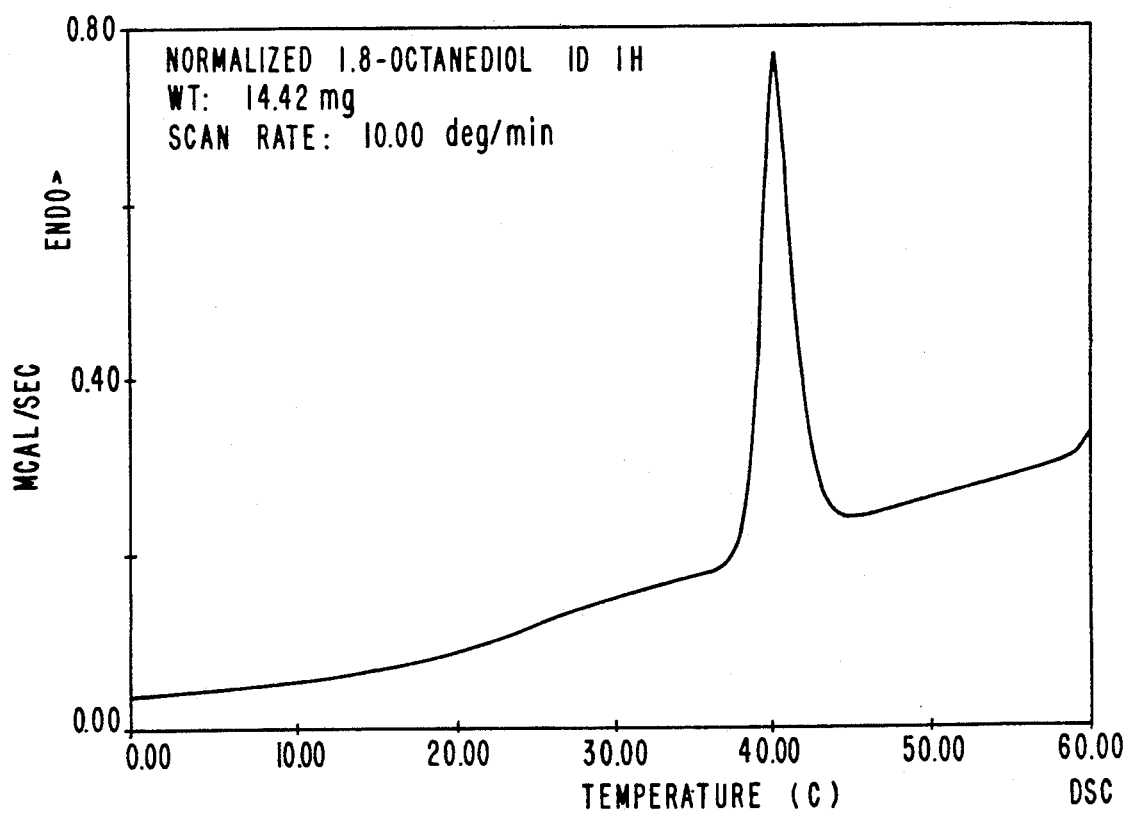
FIG. 4 is a melt profile of a finished unfractionated hard butter coating composition containing 5.0% by weight based on the weight of the fat of 1,8-octanediol in accordance with the invention on Day 1.

The stabilizing effects of 1,8-octanediol was examined using the coating composition as in Example 1. The octanediol used was a commercially available product in dried powder form. The coating composition was melted and about 5% by weight based on the weight of the fat of the 1,8-octanediol was dispersed in the composition. The amount of the diol added was based on the percent by weight of the fat in the composition. The composition was tempered using standard tempering procedures and separated into three samples and stored under identical conditions. A DSC melt profile was made from the first sample after one day as shown in FIG. 4. The melt profile shows a single peak at about 40° indicating a very rapid stabilizing effect from the diol. Compared to the control sample after the same storage time and storage conditions, the peak is considerably more defined and narrow. This sharp, narrow peak indicates the different fats in the composition are behaving as though the composition was made from a single fat. The sharp peak further reveals little or no self fractionation.

Figure 5:
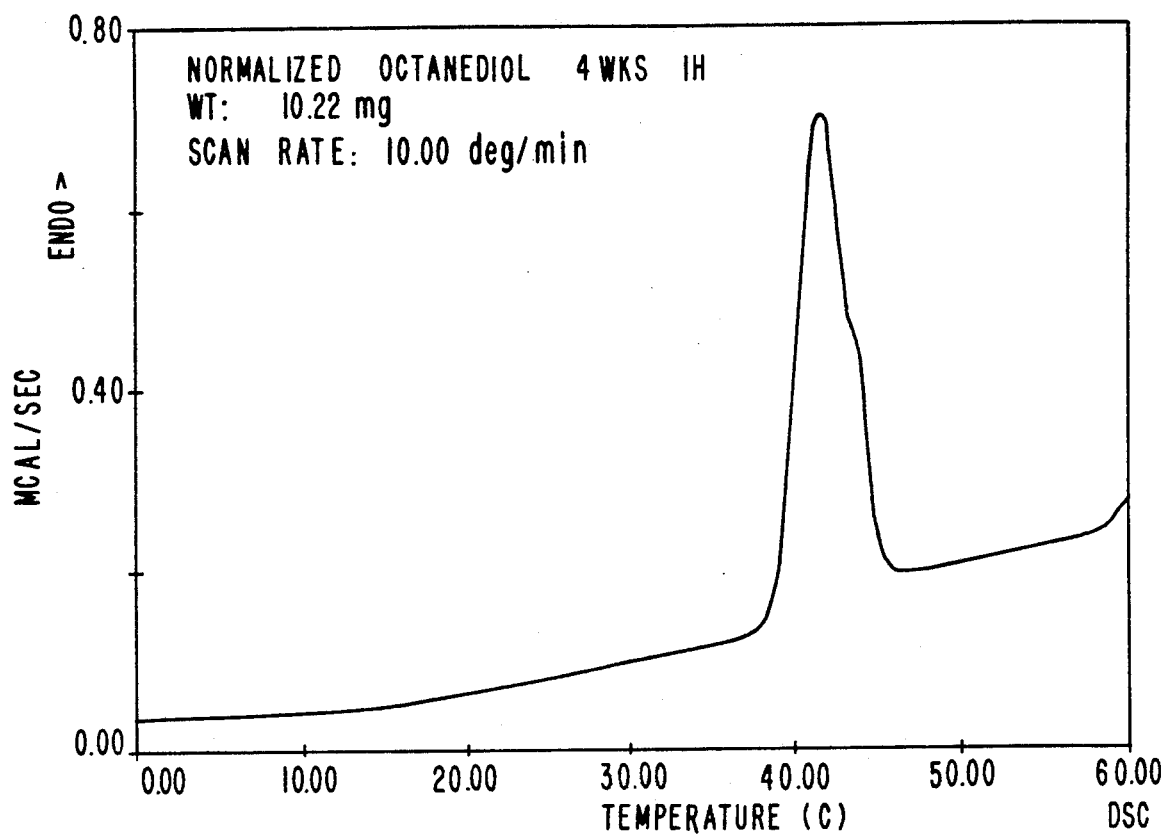
FIG. 5 is a melt profile of a finished unfractionated hard butter coating composition containing 5.0% by weight based on the weight of the fat of 1,8-octanediol after four weeks.
Figure 6:
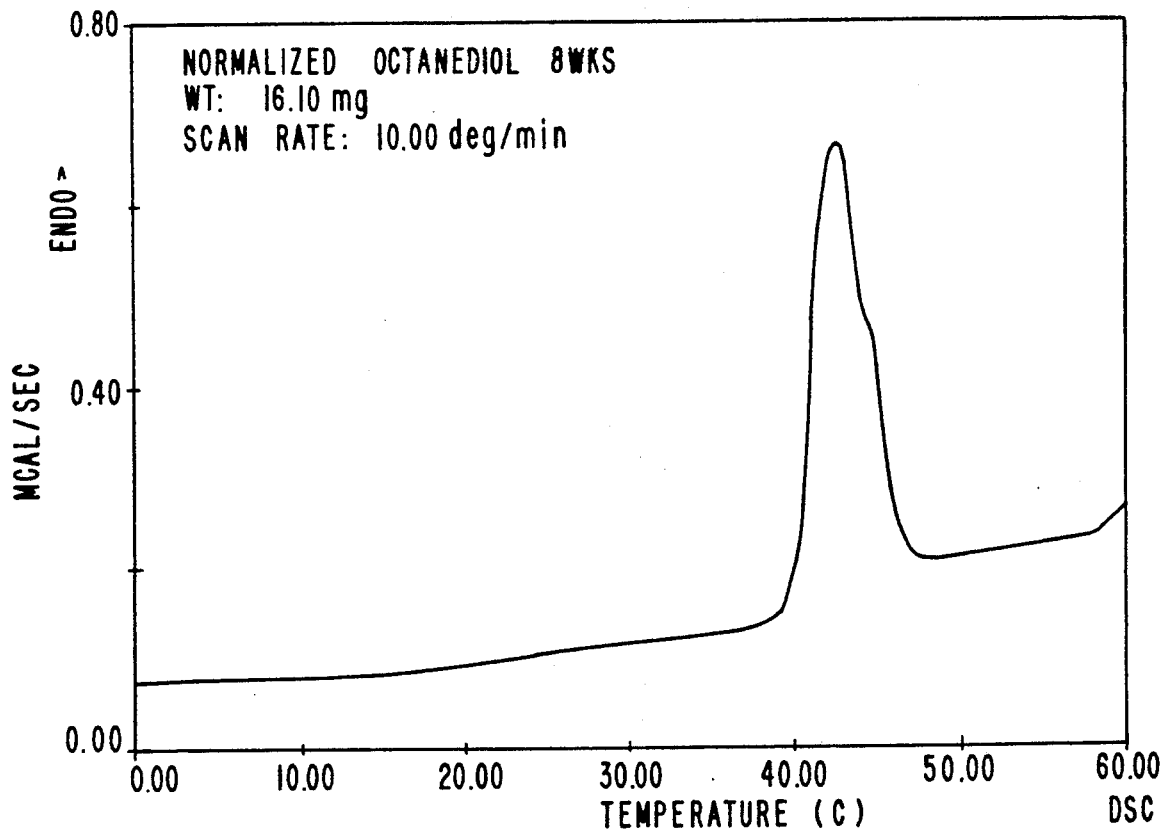
FIG. 6 is a melt profile of a finished unfractionated hard butter coating composition containing 5.0% by weight based on the weight of the fat of 1,8-octanediol after eight weeks.

A DSC melt profile of the second sample as shown in FIG. 5 was made after storing for four weeks. A similar DSC melt profile was made from Sample 3 after storing for eight weeks as shown in FIG. 6. The melt profiles after four weeks and eight weeks respectively show little or no significant change in the crystal forms of the composition from the DSC of FIG. 4. The composition shows little or no tendency to self fractionation. After eight weeks no significant fat bloom was apparent.

EXAMPLE 3

The stabilizing effect of 1,10 decanediol was examined using a tempered coating composition as in Example 1. The coating composition was melted and about 5% by weight based on the weight of the fat decanediol was added to the melt. The diol was uniformly dispersed into the composition which was then tempered using standard tempering procedures. Three samples were prepared and stored at a constant temperature of about 24° C.

Figure 7:
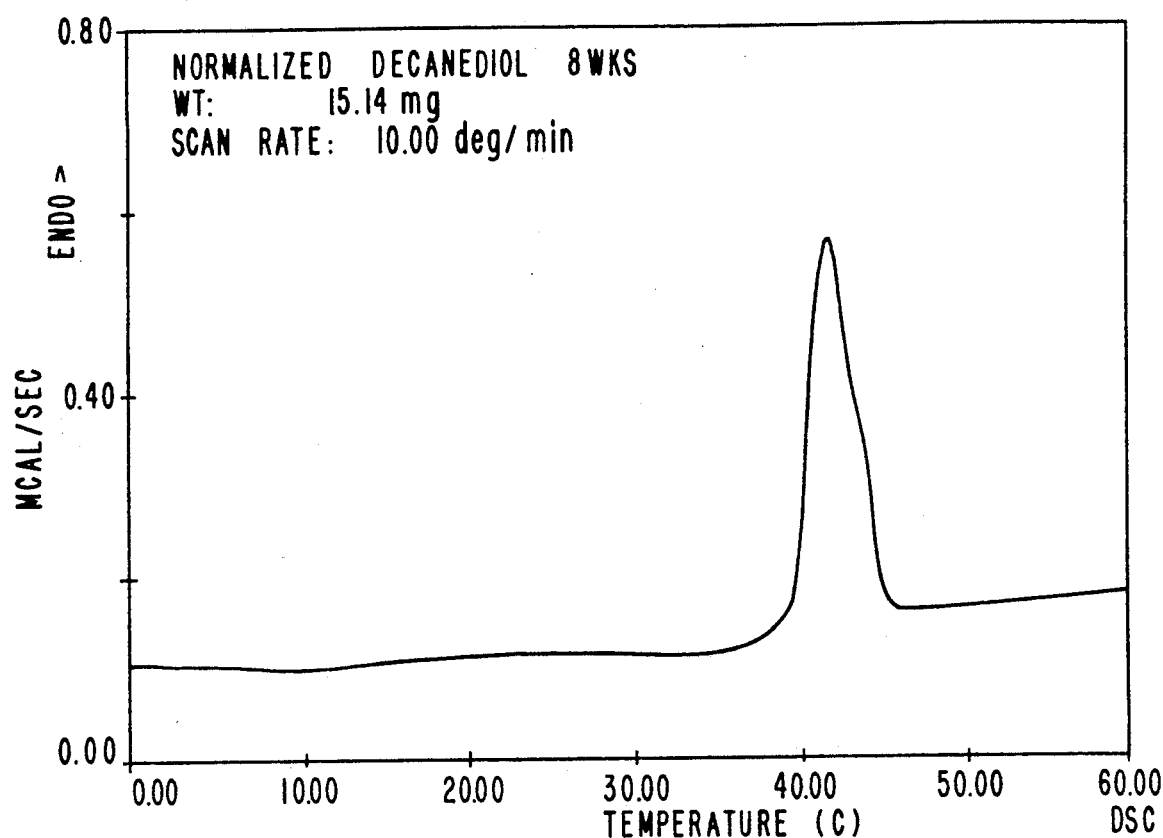
FIG. 7 is a melt profile of an unfractionated hard butter confectioner's coating composition after eight weeks containing 5% by weight based on the weight of the fat of 1,10-decanediol.

A DSC melt profile of the first sample was made after one day. The melt profile displays a sharp single peak at about 42° C. similar to the melt profile as shown in FIG. 4. No self-fractionation was apparent after one day. A DSC melt profile of the second sample was prepared after four weeks which shows little or no change in the melt profile after one day. The DSC melt profile of the third sample made after eight weeks is shown in FIG. 7. As can be seen, after eight weeks the melt profile still displays a single peak at about 42° C. with no evidence of self-fractionation. After eight weeks the composition will show a slight haze with no significant fat bloom. The DSC melt profiles from the samples containing decanediol indicate a rapid stabilizing effect from the diol to inhibit self fractionation and polymorphism.

EXAMPLE 4

The stabilizing effect of 1,12-dodecanediol was examined using a tempered coating composition as in Example 1. The composition was melted and the dodecanediol was added in the amount of about 5% by weight of the fat present in the composition. The composition was uniformly mixed and tempered using standard tempering procedures. Three samples of the composition were again prepared and stored at a constant temperature of about 24° C.

Figure 8:
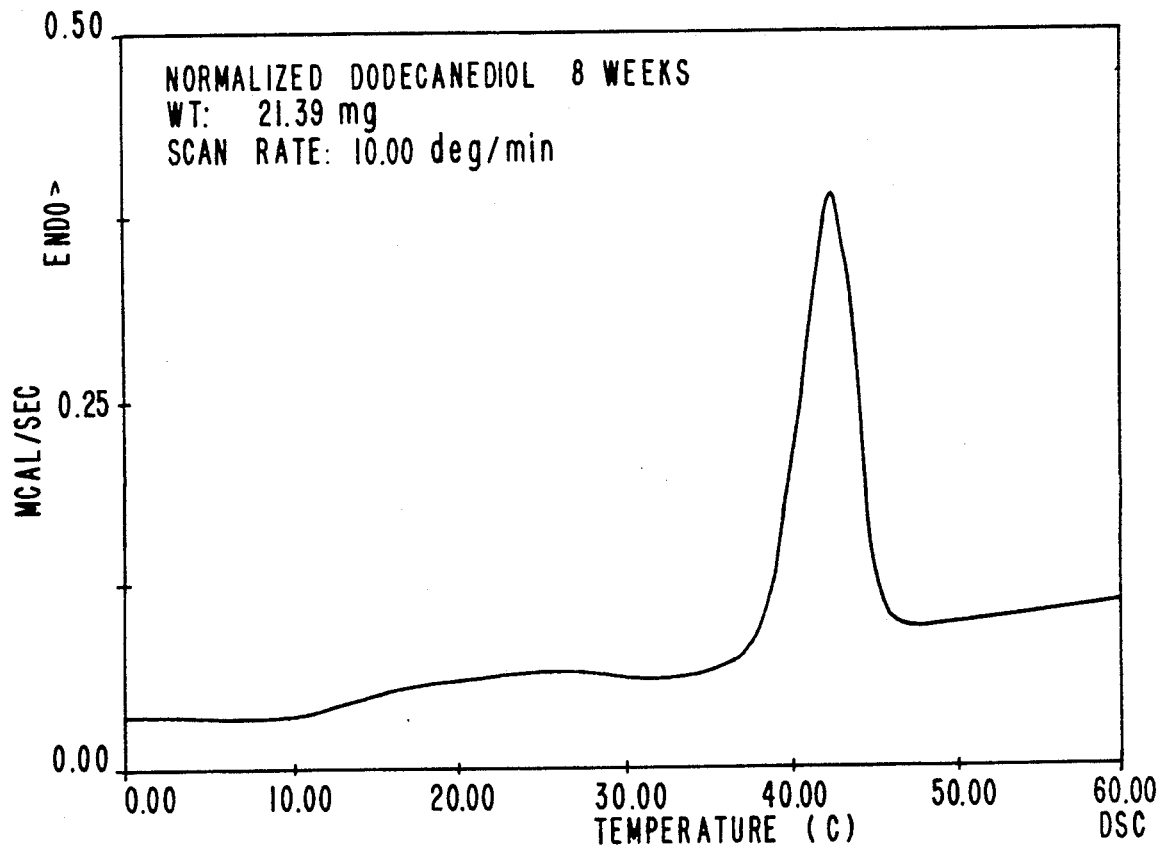
FIG. 8 is a melt profile of an unfractionated hard butter coating composition containing 5.0% by weight based on the weight of the fat of 1,12-dodecanediol in accordance with the invention after eight weeks.

A DSC melt profile of the first sample was prepare after one day. The melt profile showed a single broad peak extending from about 38° C. to about 46° C. The broad peak had a narrow shoulder at about 44° C. which was most likely due to the self fractionating characteristic of the composition. A DSC melt profile of the second sample was made after four weeks of storage. This melt profile showed a considerably narrow peak at about 41° C. The peak ranged from about 38° C. to about 44° C. The reduction of the width of the peak is indicative of the stabilizing effect of the diol. The DSC melt profile of the third sample taken after eight weeks is shown in FIG. 8. This melt profile shows a single sharp peak ranging from about 36° C. to about 44° C. The insignificant changes between the melt profiles indicate little or no self-fractionation and polymorphism of the composition and the stabilizing effect of the diol.

EXAMPLE 5

The stabilizing effect of 1,16-hexadecanediol was examined using a tempered coating composition of Example 1. The coating composition was melted and about 5% by weight of the hexadecanediol based on the weight of the fat was added to the melt and uniformly dispersed. The coating composition was then tempered using the standard procedures. Three samples of the compositions were prepared and stored at a constant temperature at about 24° C.

Figure 9:
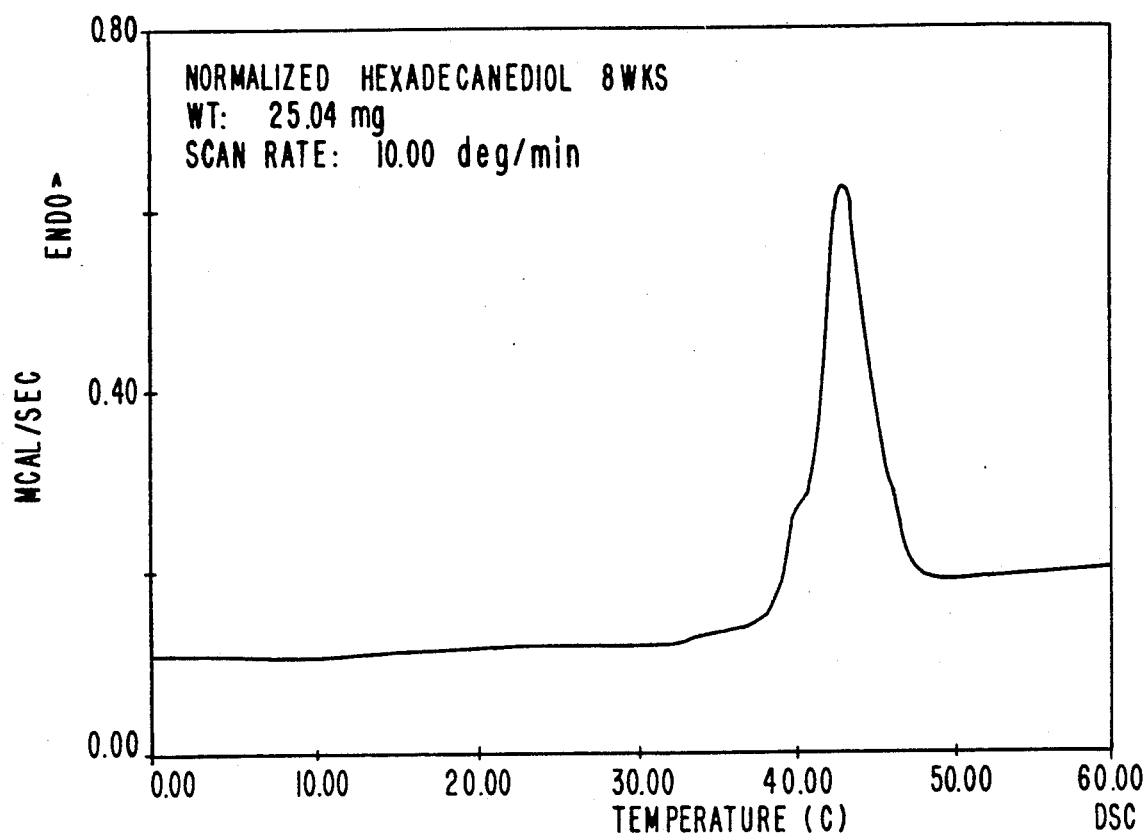
FIG. 9 is a melt profile of a finished unfractionated hard butter coating composition containing 5.0% by weight based on the weight of the fat of 1,16-hexadecanediol after eight weeks.

A DSC melt profile was prepared from the first sample after one day. The melt profile showed a single peak at about 42° C., the peak was narrow and well define indicating no self fractionation and a rapid stabilizing effect of the diol. A DSC melt profile was prepared from the second sample after four weeks. This melt profile showed a single peak at about 42° having a narrow shoulder of the peak. A DSC melt profile was prepared from the third sample after eight weeks which displays a single peak at about 42° C. as shown in FIG. 9. The changes in the peaks between the melt profile after day one and after eight weeks are insignificant and demonstrate little or no fractionation of the composition.

The above examples demonstrate a stabilizing effect of the diol on the coating composition and a resistance of the composition to self-fractionate and exhibit polymorphism. The melt profiles for the samples concerning the diols after eight weeks demonstrate a stabilizing effect when compare to the control sample after the same period of time. The control sample containing no diols produced a melt profile having a broad peak, which was less defined then the samples containing the diols, indicating the self-fractionating characteristic of the composition.

EXAMPLE 6

Figure 10:
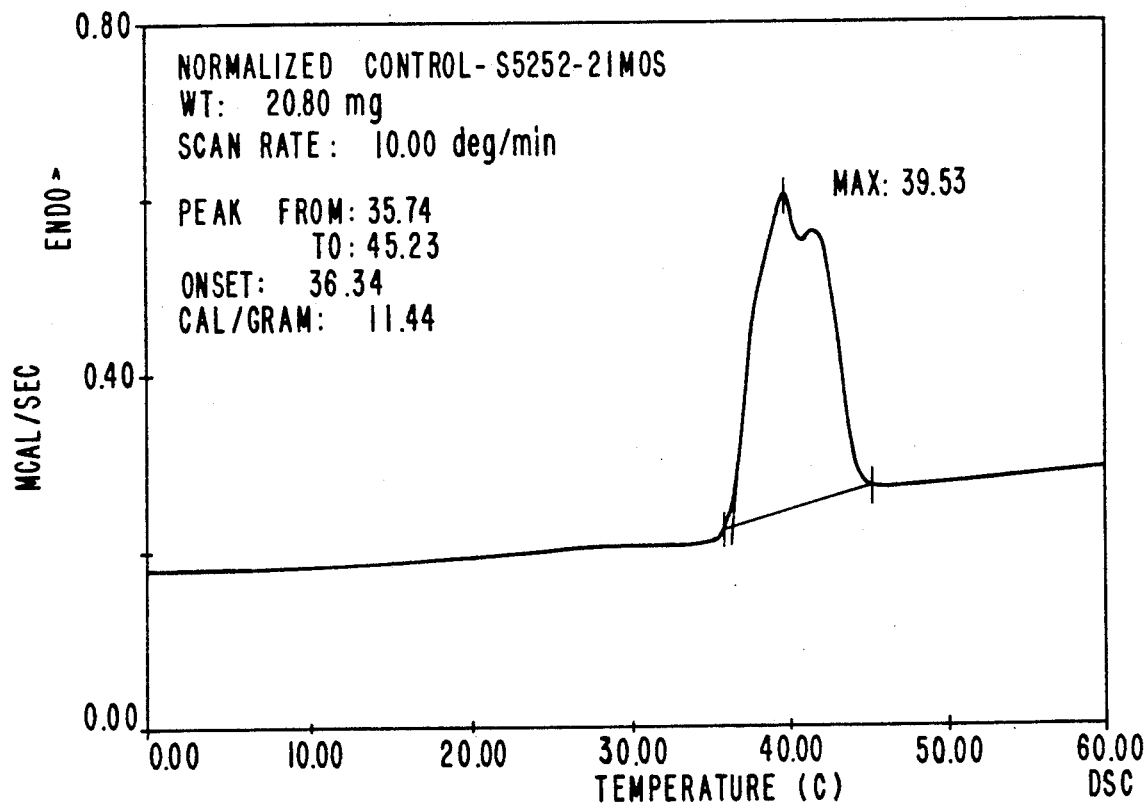
FIG. 10 is a melt profile of an unfractionated hard butter coating composition control sample after 21 months.

This example examines and compares the stabilizing effect of the diols in relation to the chain length of the molecule. A controlled sample was prepared from coating composition as in Example 1, and coated over three cookie base cakes stored at, about 24° C. for 21 months. The cookie base cake was prepared from about 23% sugar, 46% flour, 10.5% shortening, 10.5% flavoring solids such as cocoa powder, vanillia, and milk solids, 9.3% water, 0.5% salt and 0.20% lecithin by weight. Unlike the previous examples, the coating composition was not tempered. A DSC melt profile from the control sample was prepared as shown in FIG. 10. The melt profiles shows a broad peak between 35° C. and 45° C. The shoulder at about 40° C. indicates the presence of more than one crystal form.

Figure 11:
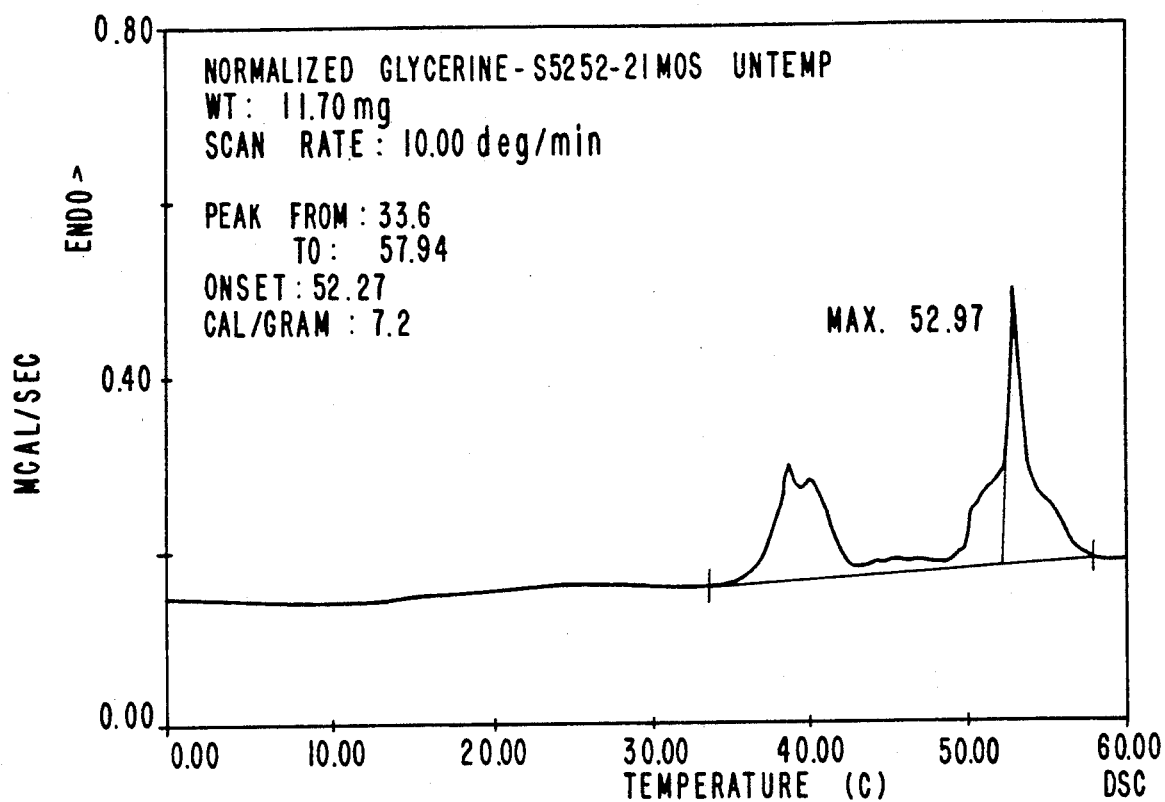
FIG. 11 is a melt profile of an untempered hard butter confectioner's coating composition containing 5% by weight based on the weight of the fat of glycerine after 21 months.

A similar second sample from the untempered coating composition as in Example 1 was prepared containing about 5% by weight glycerin based on the weight of the fat. A DSC melt profile was prepared by the sample after storage for 21 months as shown in the FIG. 11. This melt profile shows extensive fractionation and polymorphism of the fat as indicated by the broad peak from 33° to 57° C. The profile appears as a first peak from about 33° C. to about 42° C. and a second major peak from about 50° C. to 58° C. These two peaks demonstrate a significant portion of the fat crystals are present in several crystal forms. After 21 months, this sample experienced significant fat bloom.

Figure 12:
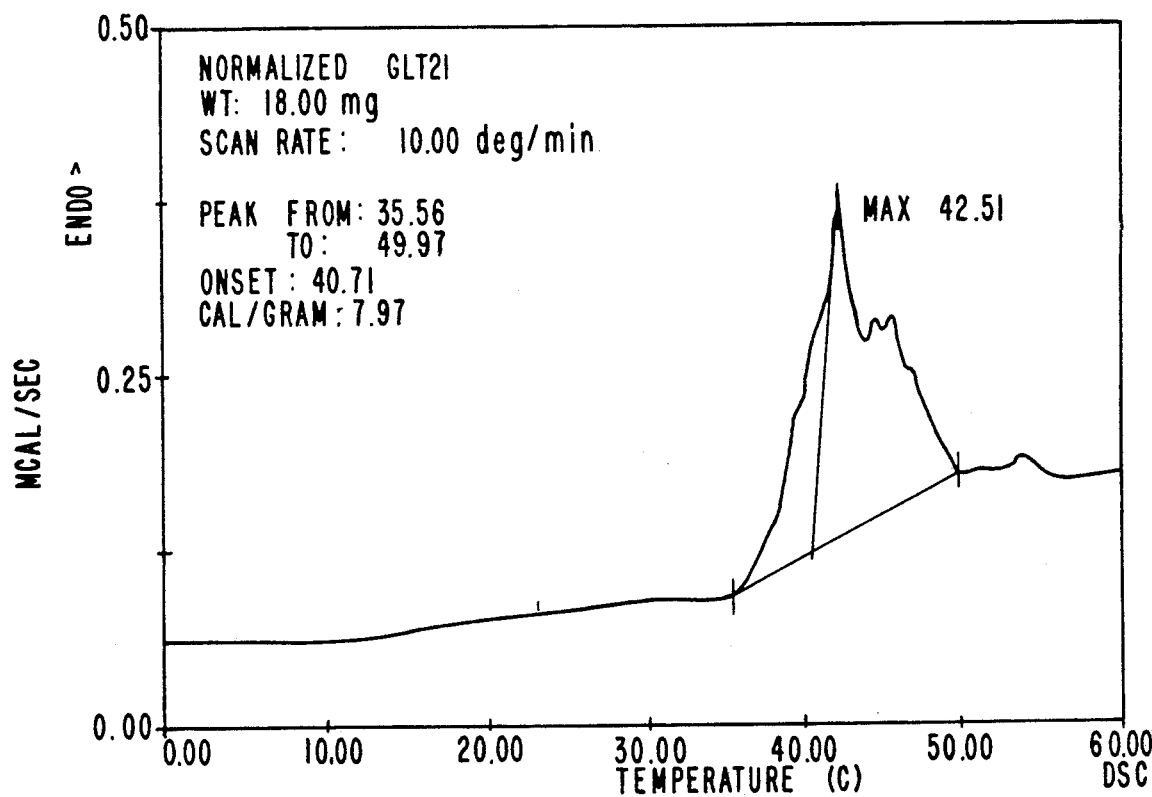
FIG. 12 is a melt profile of a tempered hard butter coating composition containing 5.0% by weight based on the weight of the fat of glycerine after 21 months.

A third sample of the coating composition was prepared containing about 5% by weight glycerin. The sample was tempered using standard tempering procedures prior to adding the glycerin. The sample was stored at about 24° C. for 21 months. At that time a DSC melt profile was prepared as shown in FIG. 12. The melt profile displays a broad peak from about 35° C. to about 50° C. The peak further shows several shoulders throughout the width which indicates significant self-fractionation and polymorphism.

Figure 13:
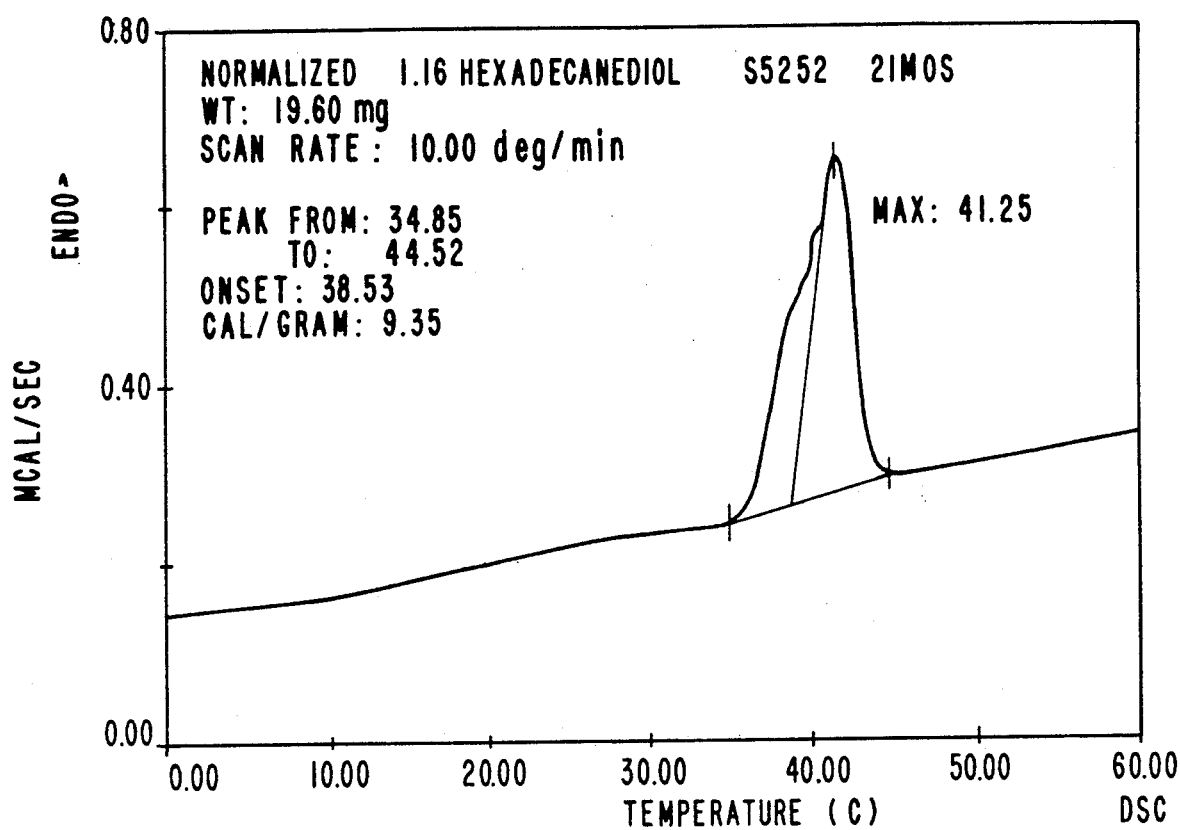
FIG. 13 is a melt profile of an untempered hard butter coating composition containing 5.0% by weight based on the weight of the fat of 1,16-hexadecanediol after 21 months.

A fourth sample was prepared from the coating composition as in Example containing 5% by weight 1,16-hexadecanediol based on the weight of the fat. The coating composition was untempered. The sample was stored at about 24° C. for 21 months. At that time a DSC melt profile was prepared as shown in FIG. 13. This melt profile shows a single peak from about 35° C. to 44° C. The narrow, well defined peak indicates little or no self-fractionation.

The melt profile of the samples demonstrates a stabilizing effect of the diol compare to glycerin. This data is believed to support the belief that the chain length of the diol is critical in inhibiting fat bloom in the coating composition. The melt profiles for the samples containing glycerine show no stabilizing effect and no ability to inhibit fat bloom. The DSC melt profile of the diol-containing sample indicates a stabilizing effect of the diol such that the composition behaves as though it is made up of a single fat.

EXAMPLE 7

Figure 14:
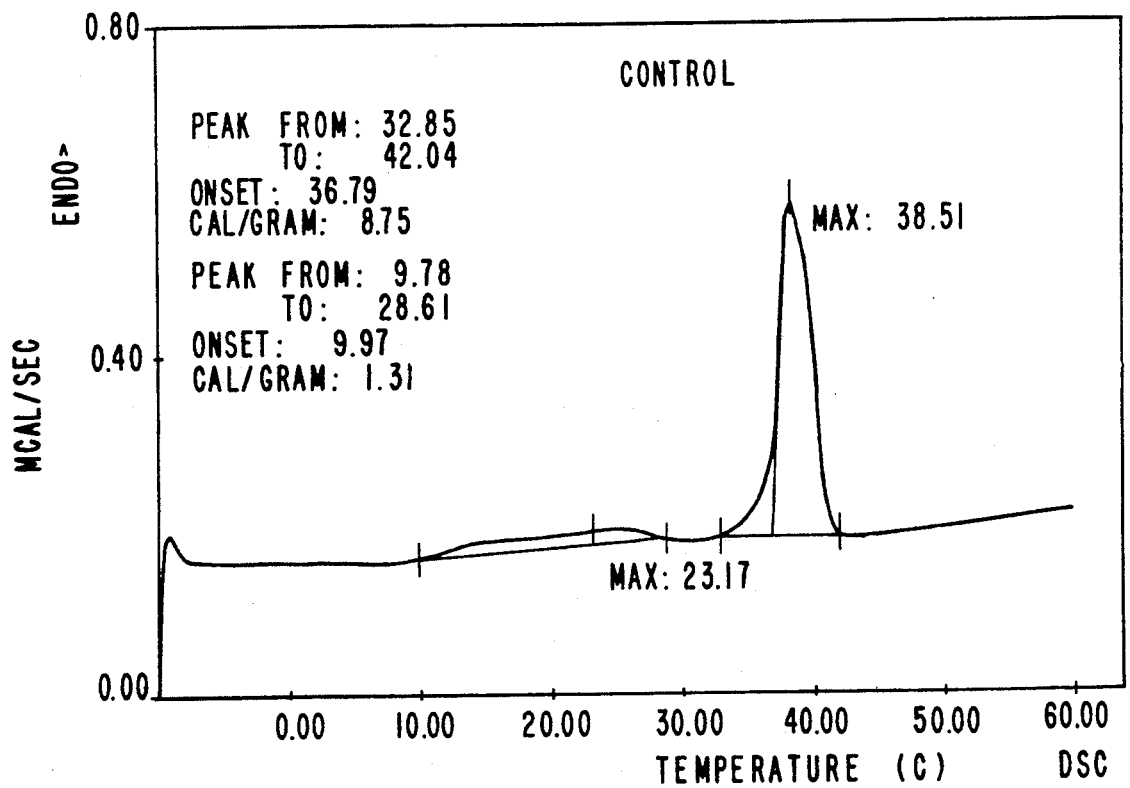
FIG. 14 is a melt profile of a control sample of a palm kernel oil-based hard butter coating composition.

This example compares the stabilizing effect of the diol on a palm kernal oil hard butter. The palm kernal oil hard butter used in this example was a commercially available fractionated and tempered hard butter. A control sample from the hard butter was prepared and a DSC melt profile was made as shown in FIG. 14. The melt profile displays a broad peak from about 9° C. to 29° C. and a second peak from about 32° C. to about 42° C. The broad peak demonstrates the unstable nature of hard butters and the tendency to self fractionate.

Figure 15:
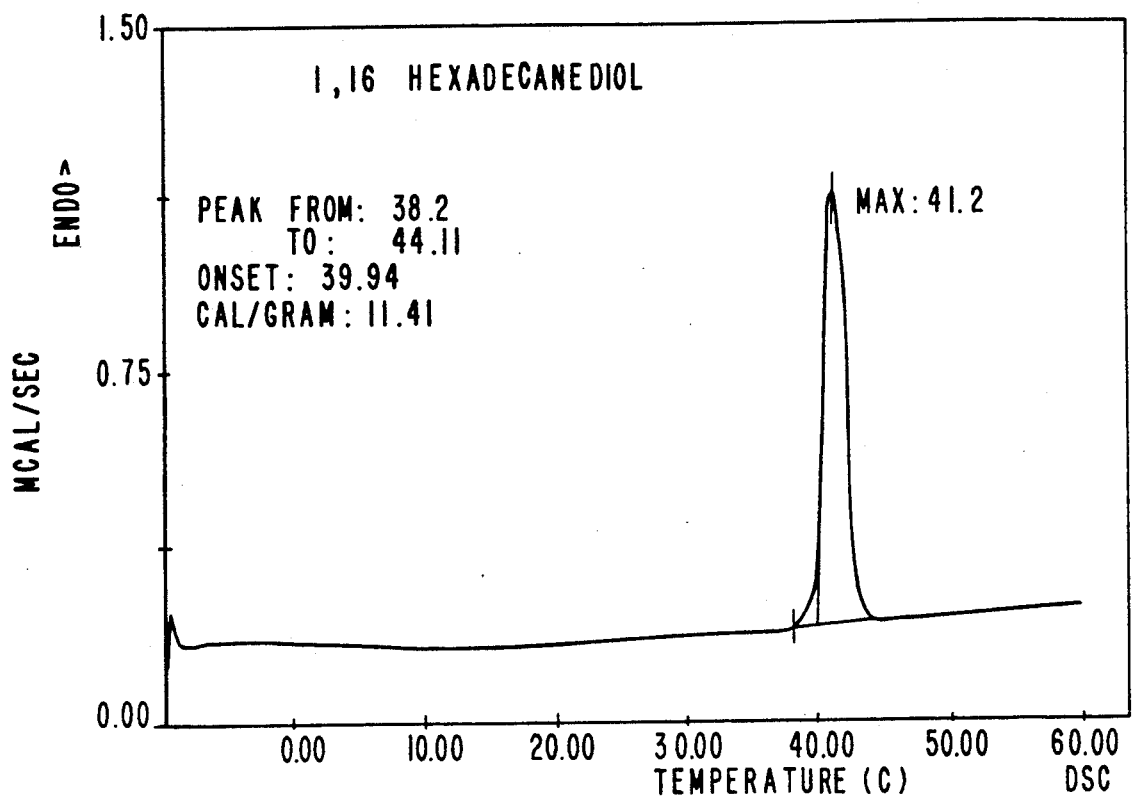
FIG. 15 is a melt profile of a palm kernel oil-based hard butter containing 5% by weight based on the weight of the fat of 1,16-hexadecanediol.

A second sample of the palm kernal oil hard butter was prepared containing about 5% by weight 1,16-hexadecanediol based on the weight of the fat. The DSC melt profile of this sample is shown in FIG. 15. The melt profile displays a sharp narrow peak between 38° C. and 44° C. The single sharp peak is indicative of the stabilizing effect of the diol. The peak of the melt profile of the diol-containing sample is considerably narrower than the peak of the control sample. This indicates a more defined crystal structure and a tendency of the composition to behave as though it was made of a single fat.

Figure 16:
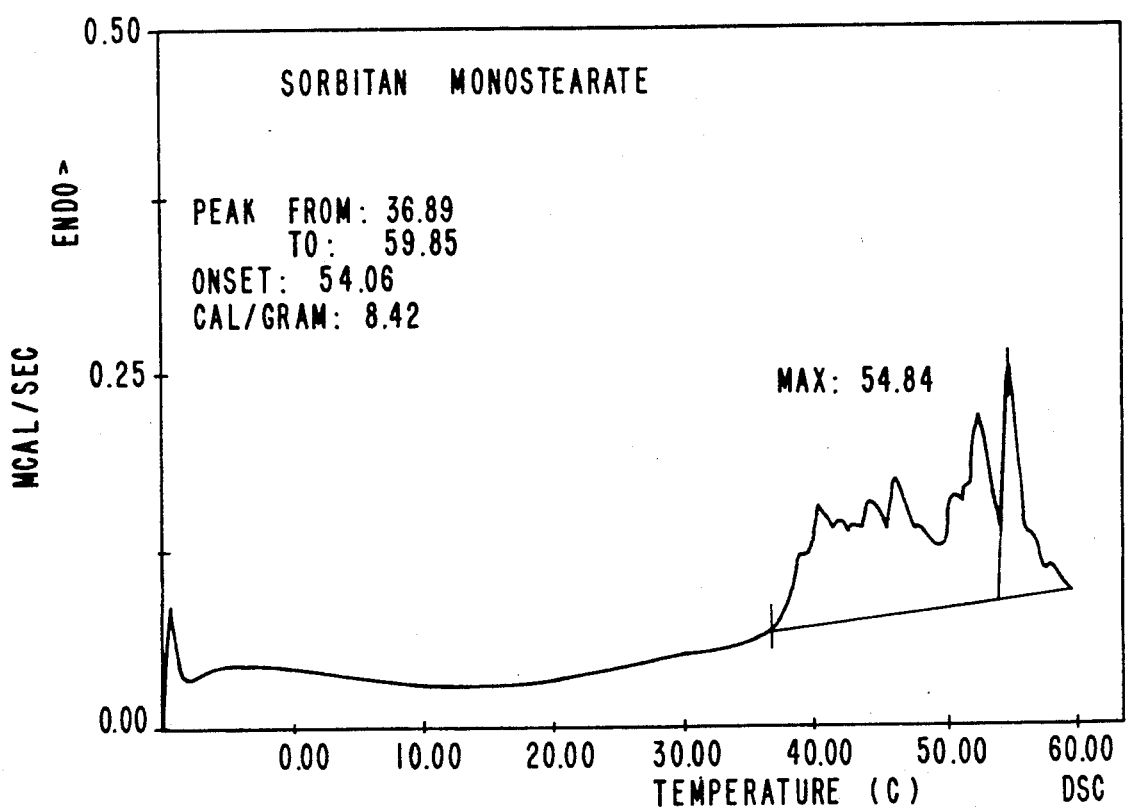
FIG. 16 is a melt profile of palm kernel oil-based hard butter containing 5% by weight based on the weight of the fat of sorbitan monosterate.

A similar sample was prepared from the palm kernel oil hard butter containing about 5% by weight sorbitan monostearate based on the weight of the fat. A DSC melt profile of this sample was prepare as shown in FIG. 16. The melt profile displays a multitude of short peaks ranging between 36° C. and 59° C. The multitude of peaks indicates extensive self-fractionation and polymorphism. These examples demonstrate the stabilizing effect of the hexadecanediol compared to an identical hard butter composition containing sorbitan monostearate. The stabilizing effect of the diol is believed to depend in part on the chain length of the diol molecule.

The above melt profiles and test data demonstrate a direct relationship between the presence of a diol in the fat composition and fat bloom prevention and gloss retention. The diols are believed to have a stabilizing effect on the fats by inhibiting self-fractionation of the different fat components and encouraging the fat composition to exhibit a fairly narrow monomorphic melt profile. Although the effects of diols on the prevention of fat bloom have been examined using only specified diols, these examples are not intended to be considered limiting as numerous other diols can be employed by one skilled in the art. The use of the diols as described herein are intended to be used in conjunction with standard processing and tempering steps commonly employed in preparing hard butter, confectioner's compositions and similar composition coatings.

The present invention is further directed to confectioner's coatings which are used to enrobe an edible base using conventional enrobing techniques. The type of edible base can vary widely including those with a high fat content or high moisture content. The above examples disclose a cookie coated with a confectioner's coating composition. The base may alternatively be a creme filled sandwich cookie, breads, rolls, pastries, pasta, fried or baked farinaceous snack foods such as corn and potato chips or tortillas, expanded dough products, breakfast cereals, creme base, and candy or confectionery such as a caramel, fondant, or marzipan. The bloom inhibiting additives are particularly suitable for inhibiting fat bloom of the confectioner's coating where the center has a high fat content which can diffuse from the center to the coating as is common with coated peanuts, peanut butter, walnuts, almonds and pecans or confectionery centers containing nuts as is typical in candies. Alternatively, the base may be a dried fruit such as raisins, dried apples, apricots or bananas or the base may be made from a fruit paste or jelly made from figs, blueberries, applies, bananas, apricots, strawberries or raisins. Confectioner's compositions containing the novel fat bloom inhibitors can be used in any fashion as such compositions are conventionally in the industry.

The confectioner's coating composition in the above examples was a chocolate-flavored PKO composition. It is to be recognized that an desired flavoring or coloring may be used in the confectioner's composition as is typically employed in the industry. In addition, the fat composition may be made up of one or more confectionery compositions typically used in the industry including, but not limited to chocolate, and the hard butter compositions of cocoa butter, palm, palm kernel, soybean, corn, rapeseed, illupe oil, phulwara, coconut, peanut and cottonseed oil.

The detailed description of the invention is provided for purposes of illustrating the preferred embodiment of the invention. It will be recognized by those skilled in the art that the preferred embodiment is not intended to limit the present invention to the particular diols and methods of processing as they may be readily modified by those skilled in the art. It will be further apparent that the numerous other modifications not mentioned herein can be made without departing from the spirit in scope of the invention as claimed in the following claims.

What is claimed is:

1. A stabilized fat composition having a resistance to fat bloom comprising a mixture of at least one fat which is solid or semi-solid at room temperature and an effective amount of a fat bloom inhibitor comprising at least one di-alcohol having the formula:

$$HOCH_2\text{-}R\text{-}CH_2OH$$

wherein R is an alkyl or alkenyl moiety having 4 to 22 carbon atoms; or, $(CH_2)_x\text{-}R_1\text{-}(CH_2)_y$ wherein R is a aryl moiety, -O-, -NH-, CO-NH-, -CO$_2$- or -CO- and x and y are 0 or an integer from 1 to 22 provided that the sum of (x+y) is an integer from 4 to 22.

2. The composition of claim 1 wherein R is a straight chain alkyl having 4 to 14 carbon atoms.

3. The composition of claim 1 wherein said diol is selected from the group consisting of 1,6-hexanediol, 1,7-heptanediol, 1,8-octanediol, 1,9-nonanediol, 1,10-decanediol, 1,12-dodecanediol and 1,16-hexadecanediol.

4. The composition of claim 1 wherein the fat is a hard butter selected from the group consisting of cocoa butter, palm, palm kernel, soybean, corn, rapeseed, illipe oil, phulwara, coconut, peanut, and cotton seed oil.

5. The composition of claim 1 wherein the fat is fractionated, hydrogenated or interesterified.

6. The composition of claim further comprising 50% to about 80% by weight suspended solids of sugar and flavorants.

7. The composition of claim 1 wherein the composition is chocolate comprising cocoa butter, sugar, milk solids, cocoa powder and lecithin.

8. The composition of claim 1 wherein said diol is suspended in the fat and has a particle size of about 5 to 200 microns.

9. The composition of claim 1 wherein said diol has a particle size of about 10 to abut 30 microns.

10. The composition of claim 1 wherein said diol is present in an amount of about 0.1 to 5.0% by weight of fat.

11. The composition of claim 1 wherein said diol is present in an amount of about 0.1 to about 2% by weight of fat.

12. A method of inhibiting fat bloom and prolonging surface gloss of a fat based composition which is solid or semi-solid at room temperature comprising the steps of:
 a) liquefying a fat-based composition;
 b) uniformly dispersing in said composition at least one solid fat bloom inhibiting agent comprising at least one diol having the formula:

$$HOCH_2\text{-}R\text{-}CH_2OH$$

wherein R is an alkyl or alkenyl having 4 to 22 carbon atoms; or $(CH_2)_x\text{-}R_1\text{-}(CH_2)_y$ wherein $R_1$ is an aryl moiety, -O-, -CO-NH-, -CO$_2$-, -NH- or -CO- and x and y are 0 or an integer from 1 to 22 provided that the sum of (x+y) is an integer from 4 to 22; and
 c) solidifying the composition.

13. The method of claim 12 wherein said fat-based composition is liquified by heating to a temperature of 35° to 70° C.

14. The method of claim 12 further including the step of tempering the fat based composition.

15. The method of claim 12 wherein said fat-based composition is an edible hard butter, triglyceride or shortening composition containing 20% to 50% hard butter, triglyceride or shortening and 50% to 80% suspended solids of sugar and flavoring agents.

16. The method of claim 12 wherein said fat based composition is a hard butter compound coating composition.

17. The method of claim 16 wherein the hard butter composition comprises at least on hard butter selected from the group consisting of palm, palm kernel, rapeseed, cocoa butter, soybean, corn, illipe, phulwara, coconut, peanut and cottonseed oil.

18. The method of claim 17 wherein said hard butter is fractionated, partially hydrogenated or interesterified.

19. The method of claim 12 wherein said fat containing composition is chocolate comprising cocoa butter, milk solids, sugar, cocoa powder and lecithin.

20. The method of claim 12 wherein said R is a straight chain alkyl having 4 to 14 carbon atoms.

21. The method of claim 12 wherein said diol is selected from the group consisting of 1,6-hexanediol, 1,7-heptanediol, 1,8-octanediol, 1,9-nonanediol, 1,10-decanediol, 1,12-dodecanediol and 1,16-hexadecanediol.

22. The method of claim 12 wherein said diol has a particle size distribution of about 5 to 200 microns.

23. The method of claim 22 wherein said diol has a particle size of about 10 to about 30 microns.

24. The method of claim 12 wherein said diol is combined with said fat composition in an amount of about 0.1 to 5.0% by weight of fat.

25. The method of claim 12 wherein said diol is combined with said fat composition in an amount of about 0.1% to 2% by weight of fat.

26. A confectionery comprising an edible base enrobed with in a fat-based confectionery coating composition which is solid or semi-solid at room temperature and comprises 20% to 50% fat and 50% to 80% suspended solids by weight, and wherein said fat-based coating composition includes a fat bloom inhibitor comprising at least one diol having the formula:

HOCH$_2$-R-CH$_2$OH wherein R is an alkyl or alkenyl having 4 to 22 carbon atoms; or (CH$_2$)$_x$-R$_1$-(CH$_2$)$_y$ wherein R$_1$ is an aryl moiety, -O-, -CO-NH-, -CO$_2$-, -NH- or -CO- and x and y are 0 or an integer from 1–22 provided that the sum of (x+y) is an integer from 4 to 22.

27. The confectionery of claim 26 wherein said edible base is a farinaceous composition selected from the group consisting of bread, roll, cookie, cracker, tortilla, fried or baked snack food, expanded dough or cereal and cake products.

28. The confectionery of claim 27 wherein said farinaceous composition comprises flour, sugar and fat or shortening.

29. The confectionery of claim 26 wherein said fat based coating composition contains about 30% to 50% of at least one hard butter selected from the group consisting of palm, palm kernel, rapeseed, cocoa butter, soy bean, corn, illipe, phulwara, coconut, peanut and cotton seed oil.

30. The confectionery of claim 29 wherein said hard butter is fractionated, hydrogenated or interesterified.

31. The confectionery of claim 29 wherein said diol is a solid and has a particle size distribution of about 5 to 200 microns.

32. The confectionery of claim 31 wherein said diol has a particle size of about 10 to about 30 microns.

33. The confectionery of claim 26 wherein said fat based coating composition is chocolate comprising cocoa butter, milk solids, sugar, cocoa powder and lecithin.

34. The confectionery of claim 26 wherein R is a straight alkyl having 4 to 14 carbon atoms.

35. The confectionery of claim 26 wherein said diol selected from the group consisting of 1,16-hexanedio, 1,7-heptanediol, 1,8-octanediol, 1,9-nonanedio, 1,10-decanedio, 1,12-dodecanediol and 1,16-hexadecanediol.

36. The confectionery of claim 26 wherein said diol is present in an amount of about 0.1 to 5.0% by weight of fat in said composition.

37. The confectionery of claim 36 wherein said diol is present in an amount of about 0.1% to about 2.0% by weight of fat in the coating composition.

38. The confectionery of claim 26 wherein the edible base is a confectionery, edible nut, or fruit base.

39. The confectionery of claim 38 wherein the fruit base is selected from the group consisting of raisins, dried apples, dried apricots and dried bananas, fig paste, strawberry paste, blueberry paste, apple paste, banana paste, apricot paste or raisin paste.

* * * * *